(12) United States Patent
Nolan

(10) Patent No.: US 6,571,881 B1
(45) Date of Patent: Jun. 3, 2003

(54) FARRIER'S SHOEING APPLIANCE

(76) Inventor: Michael Nolan, 2101 Coleman Dr., Columbus, OH (US) 43235

( * ) Notice: Subject to any disclaimer, the term of this patent is extended or adjusted under 35 U.S.C. 154(b) by 0 days.

(21) Appl. No.: 10/226,824

(22) Filed: Aug. 23, 2002

Related U.S. Application Data (60) Provisional application No. 60/370,154, filed on Apr. 5, 2002.

(51) Int. Cl.$^7$ .............................. A01L 3/00; A01L 7/02; A61B 17/08
(52) U.S. Cl. ..................... 168/20; 168/12; 606/212; D30/146
(58) Field of Search ..................... 168/6, 12, 17, 168/20; D30/146; 606/212

(56) References Cited

U.S. PATENT DOCUMENTS

| 61,982 A | 2/1867 | Austin ........................ 168/17 |
| 230,155 A | 7/1880 | Spence ........................ 54/82 |
| 619,361 A | * 2/1899 | Stephens ..................... 168/20 |
| 652,796 A | 7/1900 | Mackey ....................... 606/212 |
| 1,116,326 A | * 11/1914 | Powlowski et al. ........... 168/20 |
| 1,212,266 A | * 1/1917 | Schrader et al. .............. 168/12 |
| 3,682,179 A | * 8/1972 | Firth et al. ................. 606/212 |
| 4,819,731 A | * 4/1989 | Stubbe ........................ 168/12 |
| 4,892,150 A | * 1/1990 | Thoman ....................... 168/20 |
| 4,917,192 A | 4/1990 | Monticello .................... 168/4 |
| 5,638,905 A | * 6/1997 | Sigafoos et al. ............. 168/17 |
| 5,674,245 A | 10/1997 | Ilgen ........................ 606/212 |
| 5,692,569 A | * 12/1997 | Constantino et al. ......... 168/17 |

* cited by examiner

Primary Examiner—Charles T. Jordan
Assistant Examiner—Elizabeth Shaw
(74) Attorney, Agent, or Firm—David A. Greenlee (57) ABSTRACT

An appliance for assisting in the shoeing of horses and other animals is made of malleable galvanized sheet metal. It is formed of a pair of wings which extend outwardly from a center axis and extend upwardly from a line perpendicular to the axis at an angle of approximately 25°–40° to accommodate various hoof trim angles. The wings are wrapped about an animal's hoof and are trimmed, if necessary, to lie flush with the hoof edge. The wings each have a plurality of apertures for receiving the ends of shoeing nails that are clinched to the outer surface of the appliance. The appliance extends the life of a shoeing, prevents loose and thrown shoes and is useful in repairing cracked hooves.

9 Claims, 9 Drawing Sheets

FARRIER'S SHOEING APPLIANCE

This application claims the benefit of No. 60/370,154 filed Apr. 5, 2002.

TECHNICAL FIELD

This invention relates to shoeing of hoofed animals, and, more particularly, to an appliance which facilitates shoeing by a farrier, extends the life of the shoeing, and facilitates repair of a cracked hoof.

BACKGROUND OF THE INVENTION

Farriers apply shoes to a variety of animals on a regular basis. These include draught, show and pleasure horses, ponies and mules. These shoes last an average of four to six weeks, and then the animal must be re-shod. The reason for the relatively short life of a shoeing is that the nails which secure the shoe to the animal are clinched against the relatively soft side of the animal's hoof wall, and can pull through or become loose, thus loosening the shoe.

Loosening of the shoeing nails is caused by lateral or wedging forces imposed on the shod hoof by walking on uneven ground and by such activities as cutting, reining, roping, barrel racing, jumping and landing after a jump. All of these actions cause the shoeing nails to work lose and eventually lead to a thrown shoe. This causes the frequent re-shoeing that is all too common and expensive.

Thus, there is a need for a shoeing technique that increases the life of a shoeing.

Besides frequent re-shoeing, another problem confronting animal owners and farriers is the frequent incidence of cracked or split hooves. These must be repaired immediately or the hoof can become infected and the animal can become lame—neither of which is desirable. Many treatments for split hooves have been tried over the years. One is to bind the hoof with a cemented wrap. Another is to drive pegs, studs or nails into the hoof flanking the crack and wire or otherwise cinch the hoof parts together to close the crack so that it can heal. None of these techniques has proven to be an entirely successful hoof crack treatment.

Thus, there is a need for an improved technique for repairing cracked hooves.

SUMMARY OF THE INVENTION

Accordingly, it is one object of this invention to provide a shoeing technique that increases the life of a shoeing.

It is another object of this invention to provide an improved technique for repairing cracked hooves.

In one aspect, this invention features a method of shoeing animals that comprises the steps of:

providing a hoof appliance that is a flexible flat plate having a center axis and a pair of wings extending therefrom, said wings including a plurality of closely-spaced apertures, wrapping the plate about a hoof with the axis generally at the hoof front, positioning a shoe on the hoof, inserting nails through spaced portions of the shoe, through the hoof and out through said apertures in both wings, and clinching the nail ends onto the wings.

In another aspect, this invention features a method of repairing a cracked hoof of an animal that comprises the steps of:

providing a hoof appliance that is a flexible flat plate having a center axis and a pair of wings extending therefrom, said wings including a plurality of closely-spaced apertures, wrapping the plate about a hoof so that the appliance spans the crack with a wing on either side thereof, positioning a shoe on the hoof, anchoring the appliance in place by inserting nails through spaced portions of the shoe, through the hoof and out through said apertures in both wings, and clinching the nail ends onto the wings, thereby preventing the hoof from spreading apart and progression of the crack during movement of the animal.

In a further aspect, this invention comprises a hoof appliance for facilitating animal shoeing, comprising a flexible flat plate having a center axis and a pair of wings extending therefrom, said wings including a plurality of closely-spaced apertures for receiving shoeing nail ends, said plate being deformable to conform to the outside of a hoof.

Preferably the wings are angled upwardly relative to a line perpendicular to center axis at a predetermined angle such that the lower edge of the wings conforms generally to the edge of the hoof. The angle can vary from approximately 25° to 40°, depending on which type of animal, and whether the front or hind hooves are being shod.

These and other objects and features of this invention will become more readily apparent upon reference to the following detailed description of a preferred embodiment, as illustrated in the accompanying drawings, in which:

DESCRIPTION OF THE PREFERRED EMBODIMENT

Figure 1A:
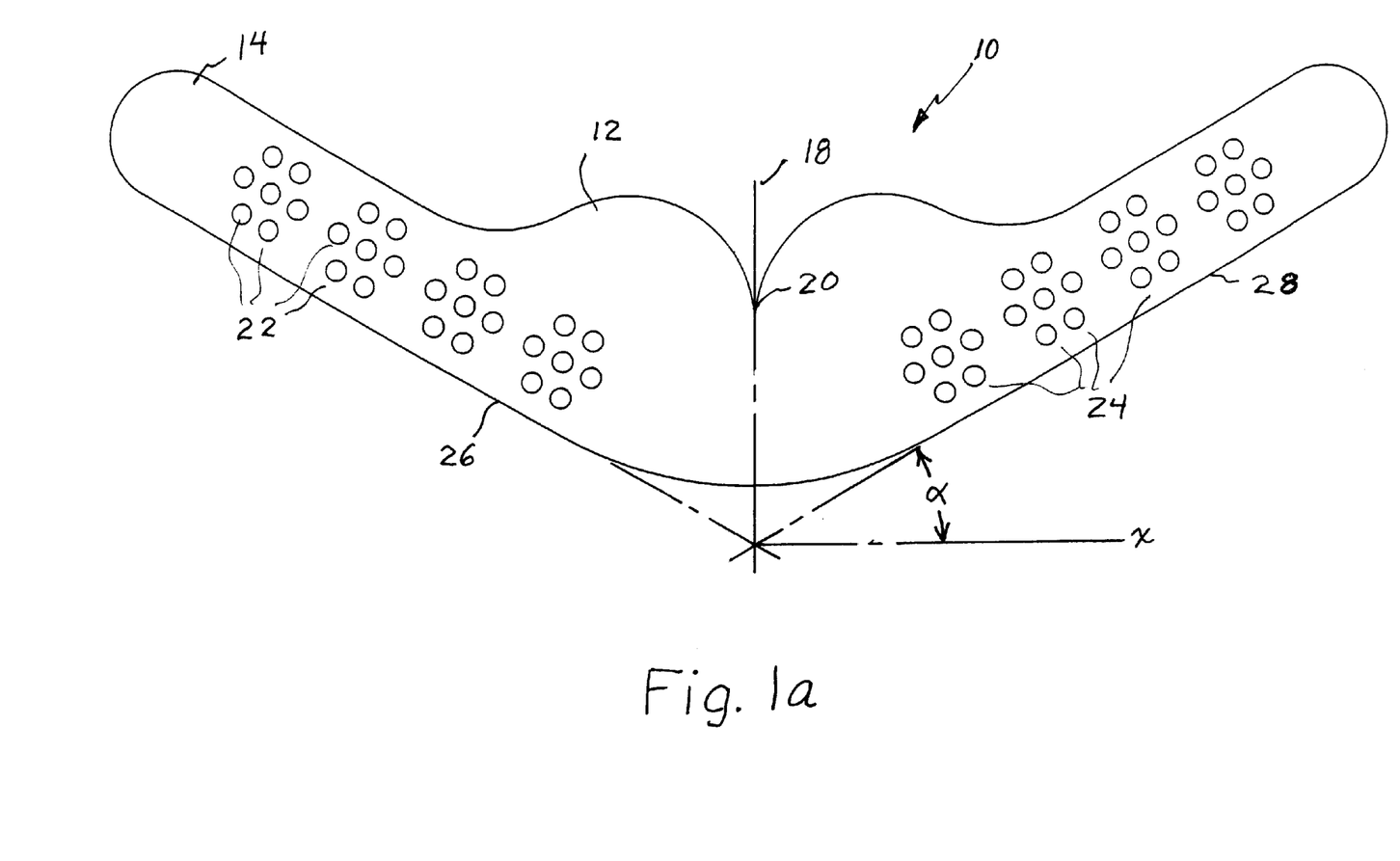
FIG. 1a is a plan view of a hoof appliance according to this invention, having a wing angle of 30°.
Figure 1B:
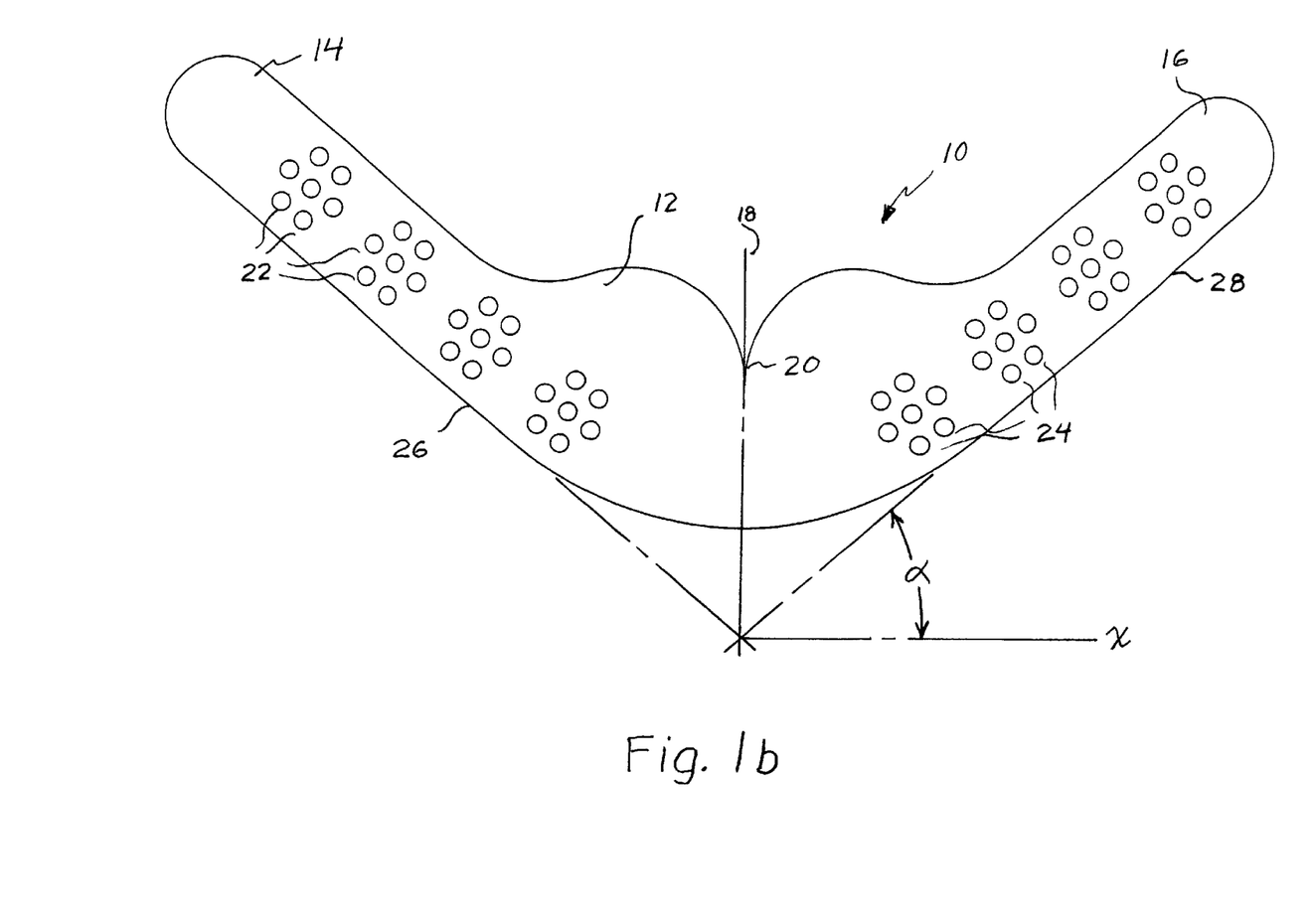
FIG. 1b is a view similar to FIG. 1b, but with a wing angle of 35°.

In FIGS. 1a and 1b, an appliance 10, according to this invention, is a flat piece of galvanized sheet metal 12 that comprises a pair of wings 14, 16 that extend from a center axis 18 that extends from a central notch 20 in the upper surface of sheet metal 12.

Wings 14, 16 include a plurality of closely-spaced, punched apertures 22, 24. Of course, appliance 10 could be made from other materials, such as aluminum, which are hard, but are readily deformable to conform to the curved surface of an animal hoof. It could also be made from a heavy mesh, which necessarily has apertures. Apertures 22, 24 are sized to receive the end of a shoeing nail, and are here illustrated as numbering four rows of sixteen apertures each. Other numbers and spacing of apertures could be used, just so that they collectively provide a plurality of locations easily found by the end of a nail when driven.

Various types of horses and mules have different shaped hooves, which are trimmed by the farrier at different trim angles, depending on how the animal is to be worked. For example, horses such as hunters and jumpers have hooves that are trimmed at trim angles different from reining horses, which are different from pleasure horses, which may be different from mules. The lower edges 26, 28 of wings 14, 16 are angled upwardly relative to a line x perpendicular to center axis at a wing angle, denoted α, to accommodate different hoof trim angles. The wing angle α can vary from approximately 25° to 40°, depending on which type of animal it is to be applied to, the trim angled to which the hoof is trimmed, and whether the front or hind hooves are being shod. A common wing angle α to fit most horses' front hooves is 30°, as illustrated in FIG. 1a. A common wing angle α to fit most horses' hind hooves, is 35°, as illustrated in FIG. 1b.

Appliance 10 can be offered in several other standard configurations of wing angle α to accommodate the majority of conventional hoof trim angles. Special situations are accommodated by having the farrier trim the wings 14, 16 so that the lower edges 26, 28 to conform to the lower edge of the trimmed hoof.

Figure 2:
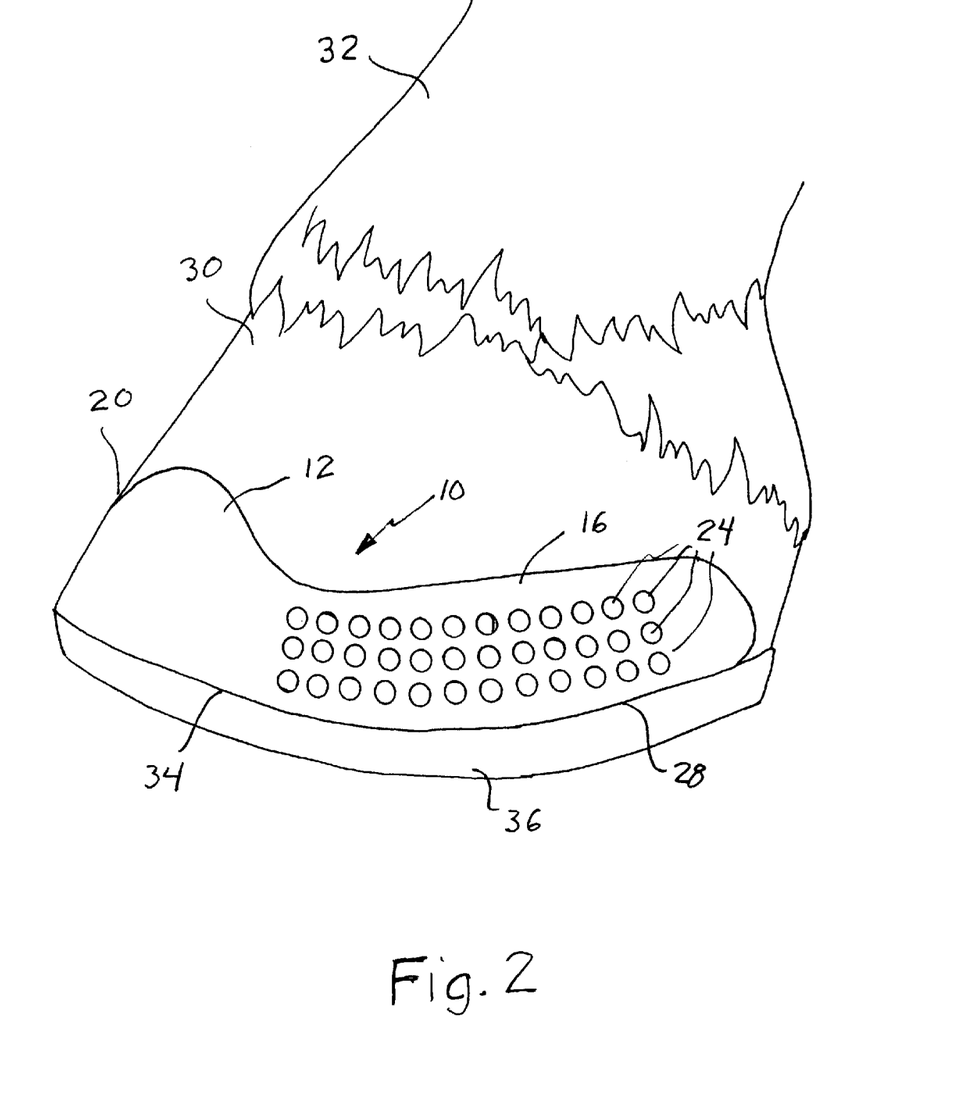
FIG. 2 is a side view of an animal hoof showing the appliance of this invention wrapped about the hoof prior to nailing.
Figure 4:
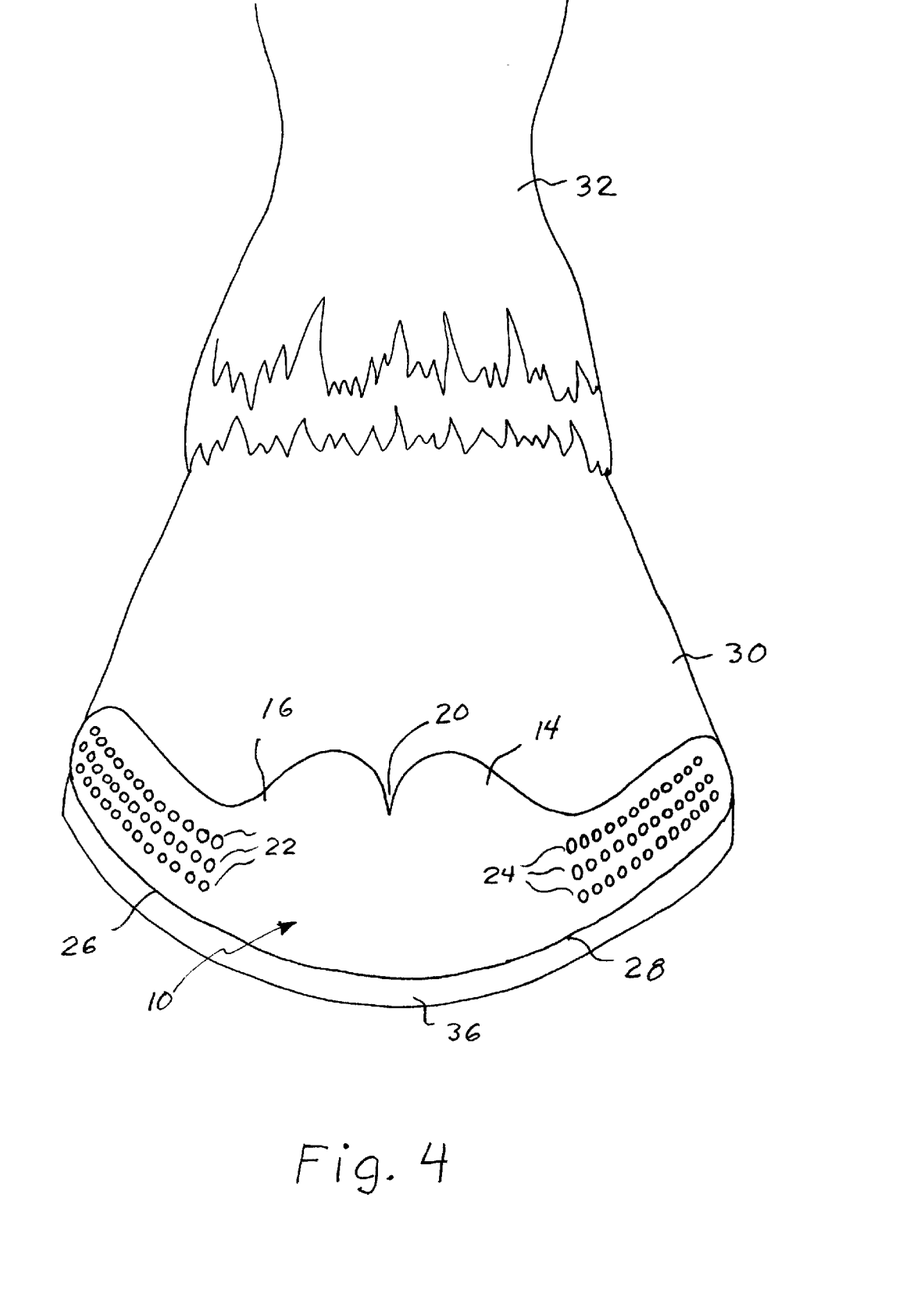
FIG. 4 is a front view of an animal hoof showing the appliance of this invention wrapped about the hoof prior to nailing.

FIGS. 2 and 4 illustrate appliance 10 as it is initially applied to a hoof 30 at the distal end of leg 32 of an animal, here illustrated as a horse. Wings 12 and 14 are bent around the contour of the wall of hoof 30, with lower edges 26, 28 conforming to the lower edge 34 of hoof 30. Appliance 10 is sufficiently malleable to hold conformation to the hoof shape.

Figure 3:
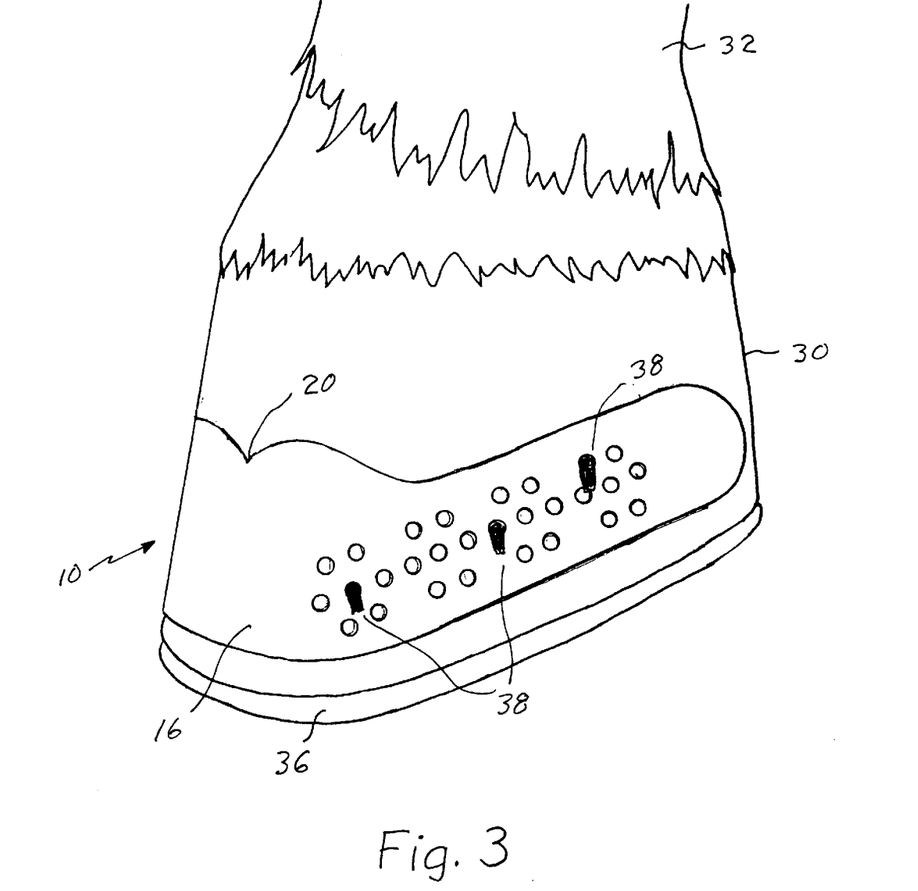
FIG. 3 is a view similar to FIG. 2, showing the appliance after nailing.
Figure 5:
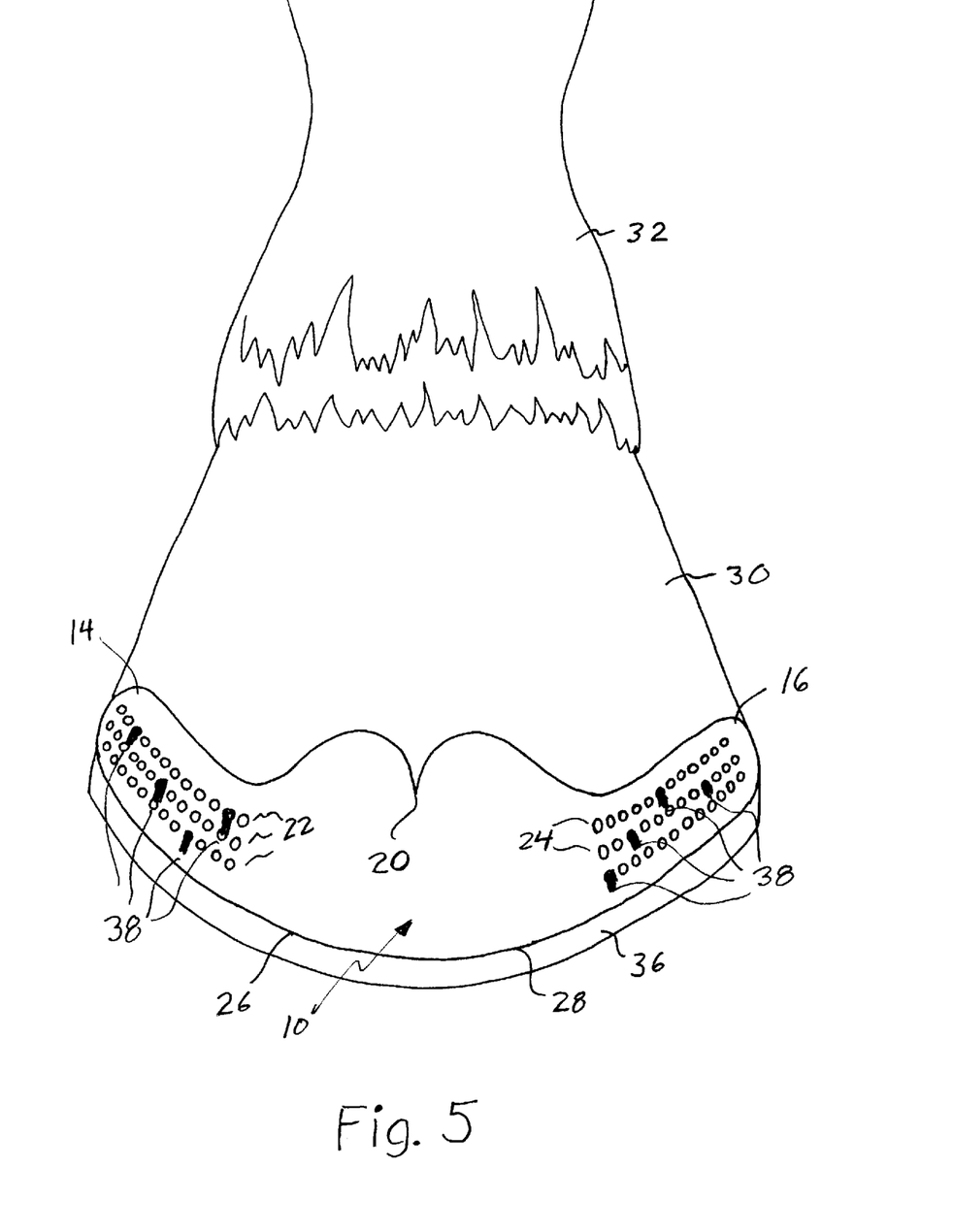
FIG. 5 is a view similar to FIG. 4, showing the appliance after nailing.
Figure 8:
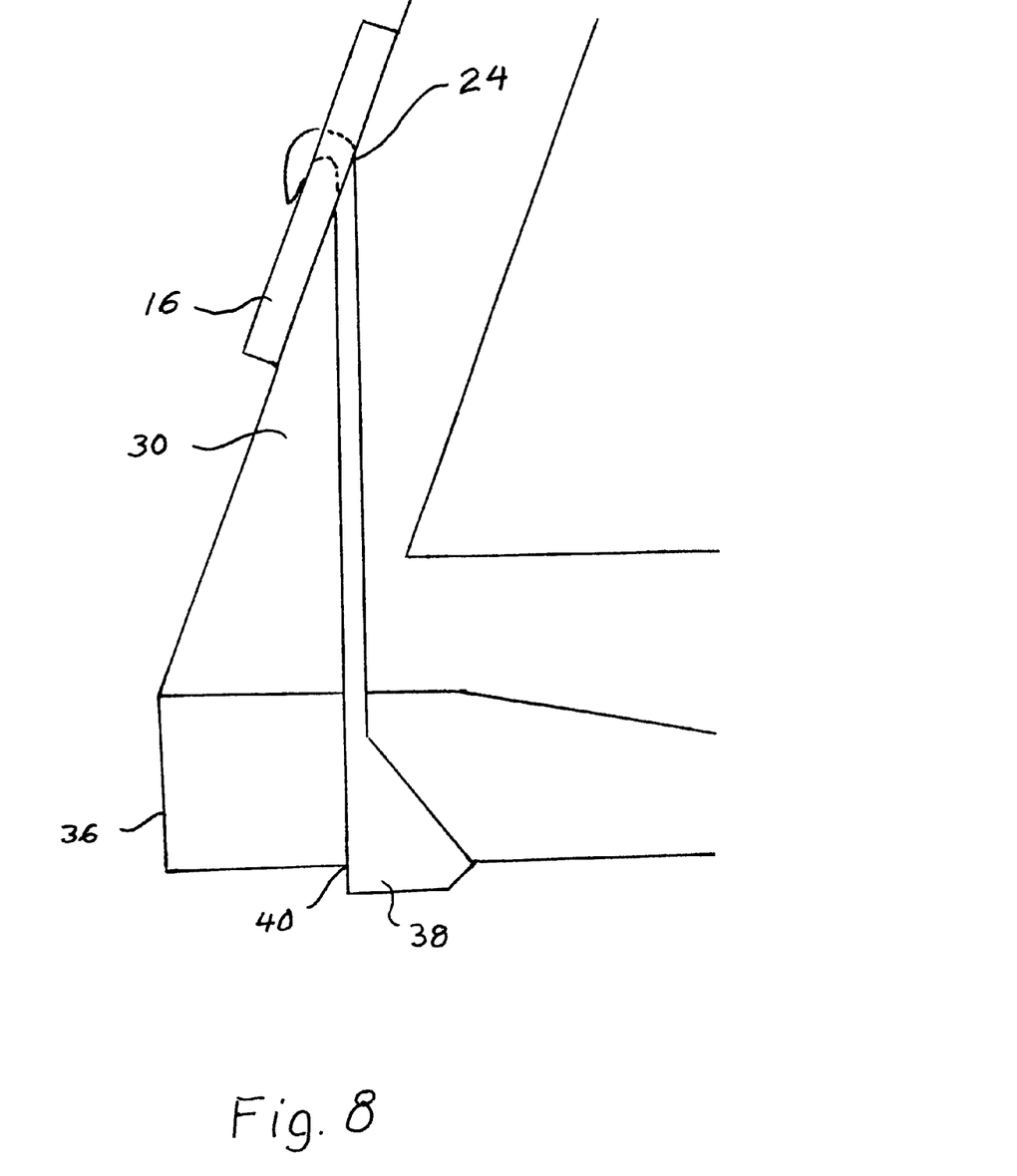
FIG. 8 is an enlarged partial sectional view illustrating a clinched nail securing a shoe and appliance to an animal hoof.

Referring now to FIGS. 3, 5 and 8, after appliance 10 is in place, a conventional shoe 36 is applied to hoof 30 and nails are driven up through shoe 36 and through the side walls of hoof, as is conventional. However, instead of clinching the ends of nails 38 against the outer wall surface of hoof 30, the ends of nails 38 project through one of the apertures 22, 24 and are clinched over against the outer surface of appliance 10. As seen in FIG. 8, each nail 38 is driven up through a hole 40 in one side of shoe 36, the tough wall material 42 of hoof 30, and out through an aperture 24 in wing 16. The same procedure is used on the other, unillustrated side of shoe 36 and hoof 30 with wing 14.

In this manner, shoe 36 is more securely held on hoof 30, since it is more difficult for nail 38 to pull through appliance 10 than through a hoof if appliance 10 were not used, as is conventional. If desired for show, the outer surface of appliance 10 can be painted black (to hide its appearance) or any decorative color. Glitter or any other decorative coating may be applied to appliance 10 to enhance the appearance of hoof 30 for show purposes.

Figure 6:
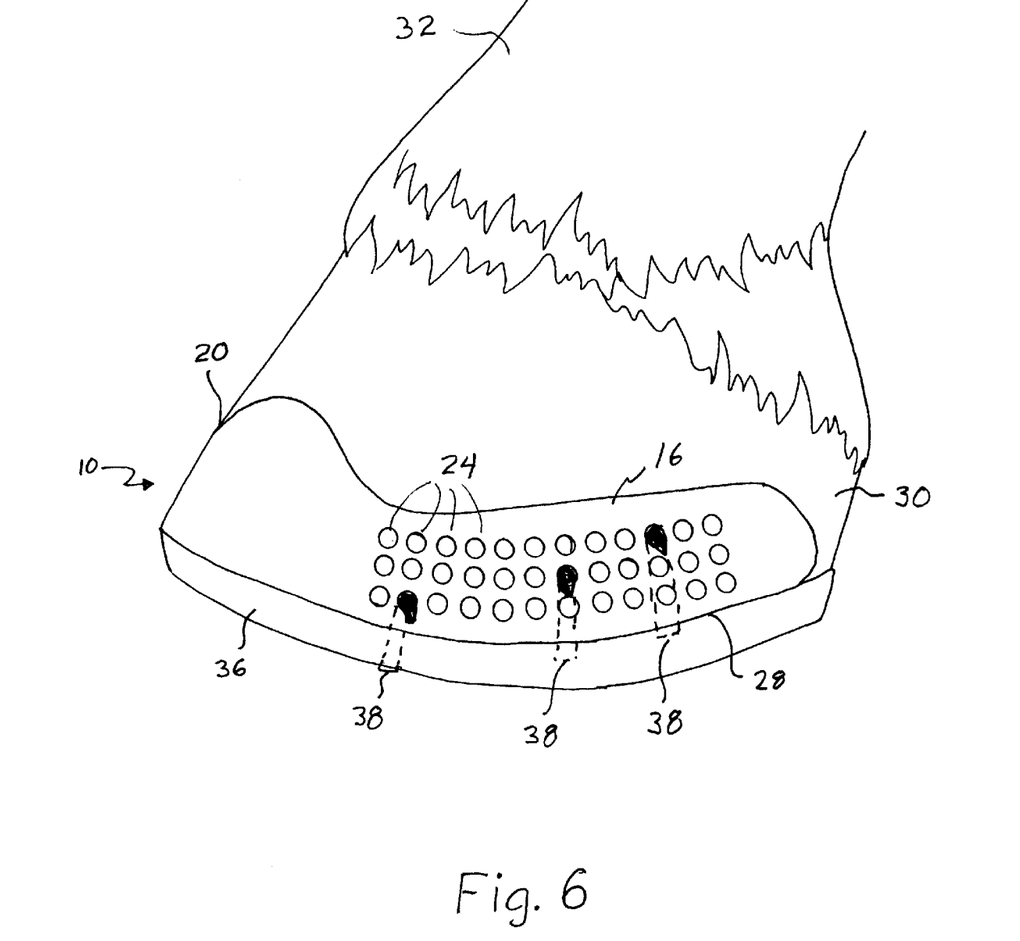
FIG. 6 is a view similar to FIG. 3, showing the appliance applied to a cracked hoof.
Figure 7:
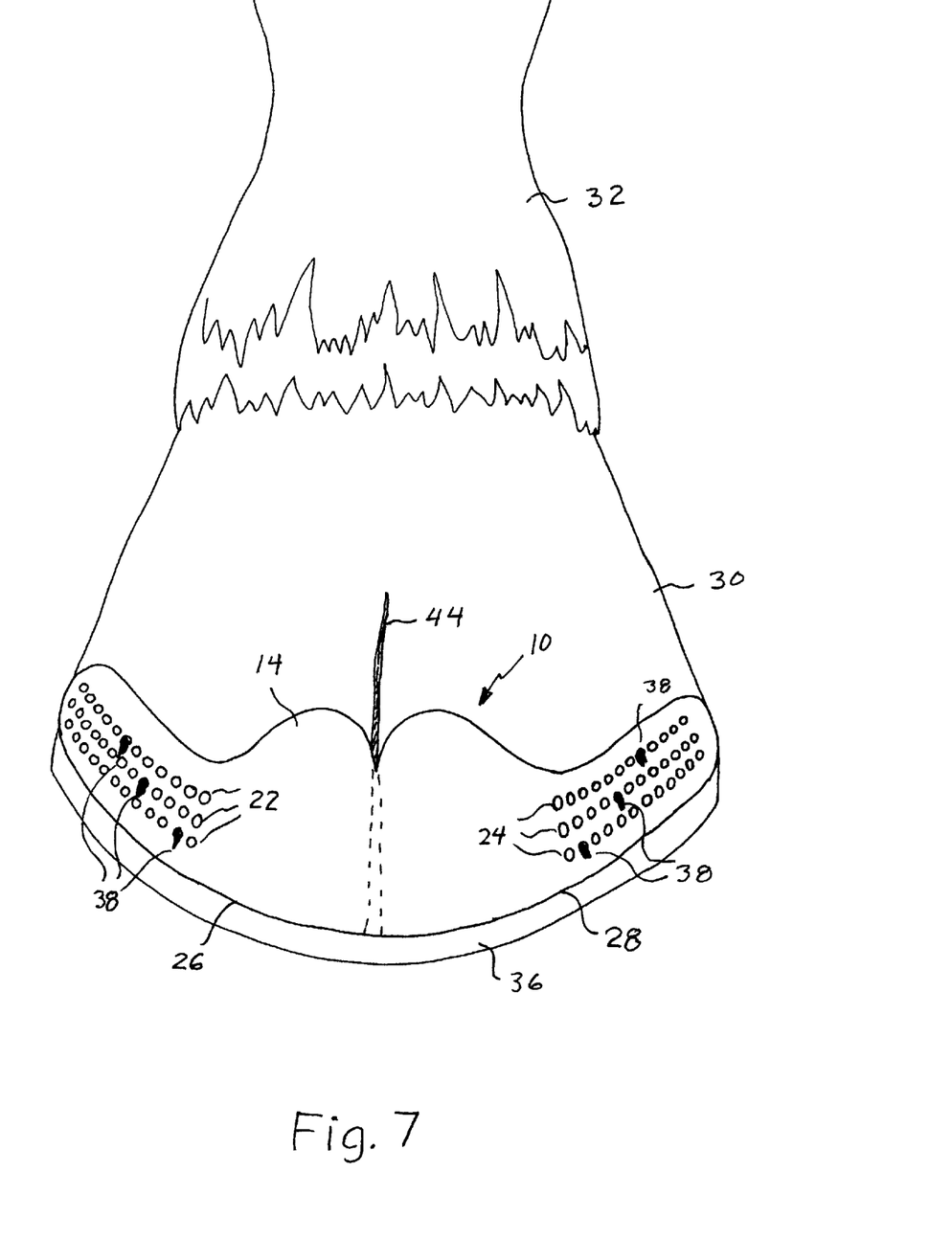
FIG. 7 is a view similar to FIG. 5, showing the appliance applied to a cracked hoof.

Referring to FIGS. 6 and 7, a hoof 30' includes a crack 44. In this case, one wing 16 is positioned on one side of the crack 44, and wing 14 on the other side. In this manner, appliance 10 prevents hoof 30 from spreading apart, and progressing the crack 44, when it engages the ground to promote healing. Appliance 10 also provides a barrier to shield the crack from intrusion by dirt or other matter.

Appliance 10 is preferably made of a thin, galvanized sheet metal that is easily bent around an animal's hoof, and can be readily trimmed by conventional shears to conform to the bottom of the hoof when in place. This will accommodate the various trim angles given the hoof by the farrier when trimming the hoof. Hunters and jumpers, pleasure horses, reining horses, such as barrel racers and roping horsed, show horses of all types, and other horses and other animals, such as mules, may require different hoof trim angles, according to the owners' requirements. The hoof trim angle will determine whether the appliance 10 must be trimmed.

Hunters, jumpers and reining horses, among others, place excessive forces on the shoes when the animal is working. This all-too-frequently causes shoes to work loose and to be thrown, which affects the immediate performance of the animal and requires immediate re-shoeing. Thrown and loose shoes are caused by the shoeing nails pulling through the relatively hoof material. Since shoeing nails, when used with the appliance of this invention, are clinched against the relatively hard galvanized metal surface, they cannot easily work loose, no matter how severe the forces placed on them by the animal.

Use of the shoeing appliance of this invention dramatically extends the life of a shoeing. Normally, a horse must be re-shod every 4–6 weeks, and more often, if the horse subjects its shoes to excessive side forces, such as hunters, jumpers, and reining horses do. Due to the growth of the hoof, a horse or other animal will grow out of its shoes, which requires a new hoof trimming and shoeing. Tests using the appliance of this invention have shown that a shoeing can last upwards of 16 weeks without harming the animal's hooves.

The shoeing appliance of this invention can be made with wings angled for standard hoof trim angles. Special, different trim angles are accommodated by the ability to trim the wings to suit each special situation.

Using the shoeing appliance of this invention to assist in the healing of cracked hooves provides a two-fold benefit. First, the appliance prevents the cracked parts of the hoof from spreading apart during animal movement, because the appliance holds the hoof parts securely together. Second, the appliance provides a barrier to the intrusion of foreign matter into the hoof, thus preventing infection of the wound.

Thus, the shoeing appliance of this invention greatly extends the life of a shoeing, inhibits the incidence of thrown shoes, and promotes healing of cracked hooves. Although galvanized metal is disclosed as preferred, other malleable and trimmable materials, such as aluminum or other metals and composites, could also be used.

While only a preferred embodiment has been described and shown, obvious modifications are contemplated within the scope of this invention, and the following claims.

I claim:

1. A method of shoeing animals' hooves that comprises the steps of:

providing a hoof appliance that is a flexible flat plate having a center axis and a pair of wings extending therefrom, said wings including a plurality of closely-spaced apertures, wrapping the plate about a hoof with the axis generally at the hoof front, positioning a shoe on the hoof, inserting nails through spaced portions of the shoe, through the hoof and out through said apertures in both wings, and clinching the nail ends onto the wings.

2. A method of repairing a cracked hoof of an animal that comprises the steps of:
- providing a hoof appliance that is a flexible flat plate having a center axis and a pair of wings extending therefrom, said wings including a plurality of closely-spaced apertures,
- wrapping the plate about a hoof so that the appliance spans the crack with a wing on either side thereof,
- positioning a shoe on the hoof,
- anchoring the appliance in place by inserting nails through spaced portions of the shoe, through the hoof and out through said apertures in both wings, and
- clinching the nail ends onto the wings, thereby preventing the hoof from spreading apart and preventing progression of the crack during movement of the animal.

3. A hoof appliance for facilitating animal shoeing, comprising a flexible flat plate having a center axis and a pair of wings extending therefrom, said wings including a plurality of closely-spaced apertures for receiving shoeing nail ends, said plate being conformable to the outside contour of a hoof.

4. The hoof appliance of claim 3, wherein the wings are angled upwardly relative to a line perpendicular to the center axis at a predetermined angle such that the lower edge of the wings conforms generally to the edge of the hoof.

5. The hoof appliance of claim 4, wherein the angle is approximately 25°–40°, depending on which type of animal, and whether the front or hind hooves, is being shod.

6. The hoof appliance of claim 5, wherein the angle is 25°–35° for use primarily in shoeing animals' front hooves.

7. The hoof appliance of claim 5, wherein the angle is 35°–40° for use primarily in shoeing animals' hind hooves.

8. The hoof appliance of claim 3, wherein the flat plate is made of a malleable material.

9. The hoof appliance of claim 8, wherein the malleable material is galvanized sheet metal.

* * * * *